US010235353B1

(12) United States Patent
Sanders et al.

(10) Patent No.: US 10,235,353 B1
(45) Date of Patent: Mar. 19, 2019

(54) NATURAL LANGUAGE TRANSLATION INTERFACE FOR NETWORKED DEVICES

(71) Applicant: Dell Products LP, Round Rock, TX (US)

(72) Inventors: Mark S Sanders, Roanoke, VA (US); Gavin R Cato, Los Gatos, CA (US)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 15/706,548

(22) Filed: Sep. 15, 2017

(51) Int. Cl.
*G06F 17/27* (2006.01)
*G06F 17/28* (2006.01)
*G06F 17/30* (2006.01)

(52) U.S. Cl.
CPC .......... *G06F 17/271* (2013.01); *G06F 17/289* (2013.01); *G06F 17/30976* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 5,640,490 A * | 6/1997 | Hansen | .................... | G10L 15/02 704/254 |
| 6,212,541 B1 * | 4/2001 | McAuliffe | ............ | G06F 3/0481 718/100 |
| 6,718,307 B1 * | 4/2004 | Buil | ...................... | G06F 1/3203 704/270 |
| 6,813,341 B1 * | 11/2004 | Mahoney | ............. | G06Q 10/087 340/572.1 |
| 7,769,593 B2 * | 8/2010 | Venkataraman | ........ | G10L 15/20 381/110 |
| 8,452,597 B2 * | 5/2013 | Bringert | ................... | G10L 15/28 704/231 |
| 9,734,839 B1 * | 8/2017 | Adams | .................... | G10L 21/00 |
| 2010/0299437 A1 * | 11/2010 | Moore | ................ | H04L 67/1008 709/226 |
| 2018/0329729 A1 * | 11/2018 | Sun | ...................... | G06F 9/45504 |

FOREIGN PATENT DOCUMENTS

EP          3079372 A1 * 12/2016    ............. H04N 21/41

* cited by examiner

*Primary Examiner* — Jesse S Pullias
(74) *Attorney, Agent, or Firm* — Staniford Tomita LLP

(57) ABSTRACT

Embodiments for translating an input message into a device specific command for a network interface device, by: receiving the input message as a generalized language message at an input interface; separating the input message into its language parts to identify keyword elements; identifying keyword actions, targets, and variables used to indicate corresponding device specific commands; classifying the keyword elements against a learned language map to identify a best match action; utilizing the best match action to access a playlist data set for the device specific commands of the target device for execution; and providing a feedback path to a learning mechanism for adding new message and language semantics into the learned language map when identification of the best match action is unclear.

19 Claims, 9 Drawing Sheets

NATURAL LANGUAGE TRANSLATION INTERFACE FOR NETWORKED DEVICES

TECHNICAL FIELD

Embodiments are generally directed to network device interfaces, and more specifically to a natural language translation interface for networked devices.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern large-scale networks are composed of a vast number of node or terminal devices (e.g., computers, storage, appliances, and routing devices (e.g., switches, routers, firewalls, etc.). The ability to monitor, provision, and control these networked devices is becoming increasingly complex given such the wide range and types of equipment from routers, switches, servers, storage devices, and so on, as well as the number of different vendors that provide the equipment.

Network management operations typically involve the monitoring, provisioning, and control of network devices, and is usually handled through a client issuing commands through a management interface. These interfaces are typically sourced through a Command Line Interface (CLI) that is accessible through a network channel, a web browser interface, or a management channel such as REST (representational state transfer), Puppet, Ansible, or other similar channels. The limitation of these interfaces is that they require specialized knowledge of the specific device command set as well as access through the management services interfaces. This limitation poses a great challenge for network management, as each device typically has its own unique interface and command set for performing management operations. In addition, the interfaces to devices in the network topology are driven by presumed guidelines where customers require vendors to be similar to the certain de-facto standards, such as the present desire for CLIs to conform to known syntaxes, such as "Cisco-like," or other similar conventions.

A significant development accompanying the advent of machine intelligence and machine learning, is a movement to provide systems that can understand natural language syntax in their operation. For example, natural language syntax is migrating into devices from phones and tablets, to home appliances and automation/security devices. A logical extension of using natural language in man-machine interfaces is to apply the techniques to network device operations. Utilizing natural language can minimize the needs for special training and certifications to understand the command sets of the numerous vendor network devices, and level the playing field for the equipment suppliers. It can thus disrupt the norm of requiring and imposing specialized training and certification needs for the equipment by allowing generalized language to be used by the end users themselves for the operation of the devices. An example of this would be the elimination of the requirement for CCIE certification of IT (information technology) staff to work with a Cisco network device. Present network device systems do not employ natural language interfaces to any sufficient degree to take advantage of the benefits provided by interacting with the network devices through a natural language syntax.

What is needed, therefore, is a generalized language interface to harmonize the command sets of the numerous vendor network devices, and simplify the learning process in configuring and operating these network devices. What is further needed is a network interface system that uses natural language translation to provide device interfaces that allows the use of natural language syntax for input commands by device users.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and Dell Networking trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
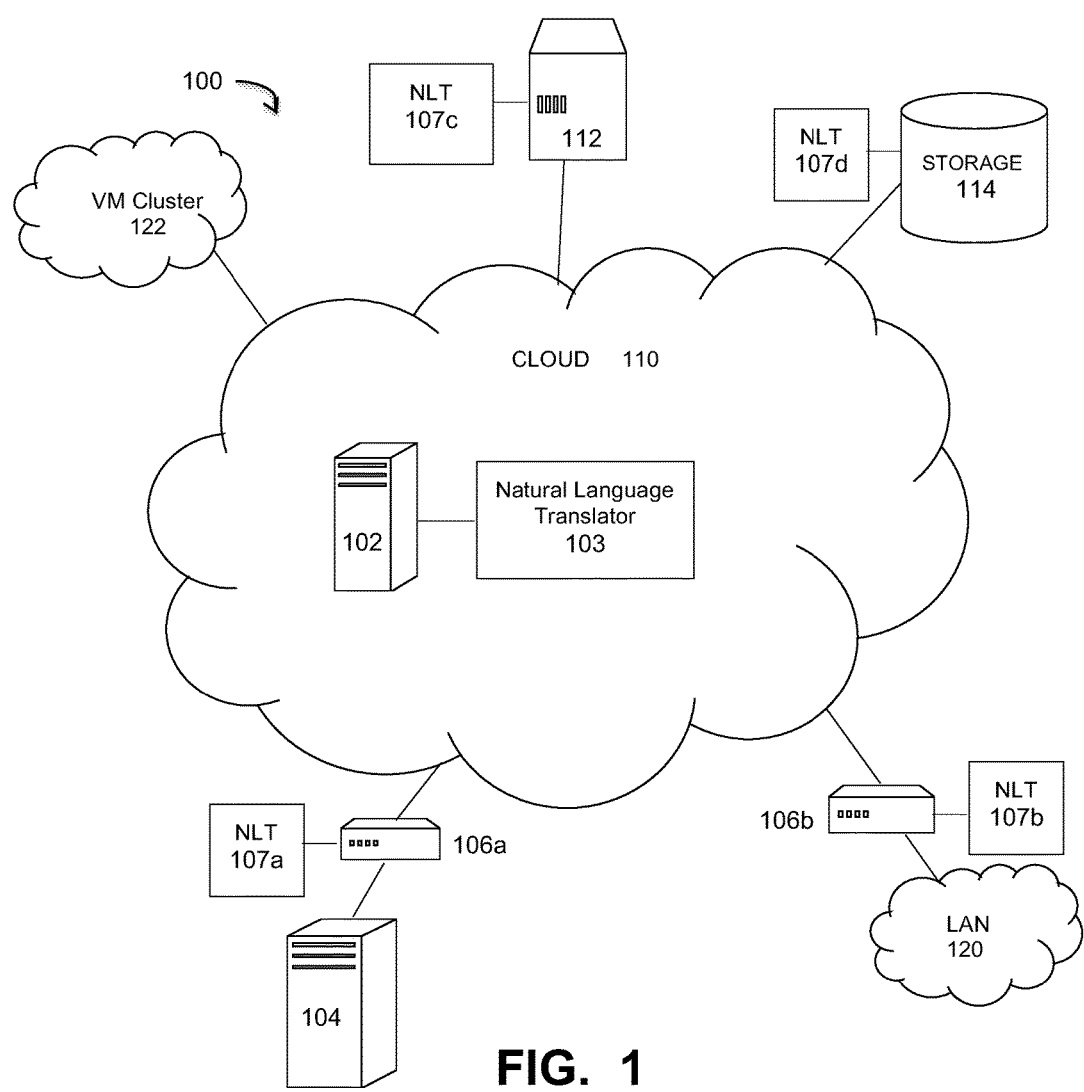
FIG. 1 illustrates a large-scale network system with devices that implement one or more embodiments of a natural language translation interface and process, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Disclosed herein are methods and systems of providing a generalized language interface that utilizes natural language syntax for disparate devices in a computer network. Such an interface or method of processing user input commands may be referred to herein as a natural language translator (NLT) interface, component, process, or operation for use with or in network interface devices, such as routers, switches, firewalls, and other edge devices.

FIG. 1 illustrates a computer network that implements a natural language translation process for networked devices, under some embodiments. System 100 comprises a large-scale network that includes a number of different devices, such as server or client computers 104, networked appliances 112, storage devices 114, and other similar devices or computing resources. Other networks may be included in system 100 including local area network (LAN) 120 and virtual machine (VM) cluster 122. These devices and network resources may be connected to a central network, such as cloud computing network 110 that itself contains a number of different computing resources (e.g., computers, interface devices, and so on). FIG. 1 is intended to be an example of a representative system implementing a natural language translator process under some embodiments, and many other topographies and combinations of network elements are also possible.

As shown in FIG. 1, system 100 is built around a cloud network 110. The system thus comprises computing devices within the cloud (e.g., server 102) and computers outside of the cloud (e.g., server 104, appliance 112, and so on). The networked devices are connected to network 110 through interface devices such as routers or switches 106a to 106d or internal interfaces, such as for appliance 112 and storage 114, as well as for sub-networks, such as VM cluster 122. These interface devices can comprise any appropriate type of transmission, routing, filtering, or security device, such as a router, switch, firewall, and so on. When they are used to couple devices to cloud 110 (or other central network), they are typically referred to as edge devices. In general, an edge device is a device that provides an entry point into a network, such as the cloud, and may include a switch, router, firewall, server computer, storage device, or any other appropriate processing device that provides interfacing, transmission, or other system functions. Though some devices, such as storage may be considered cloud resident devices (e.g., since they provide a storage location for other cloud edge devices to house their information), such devices can exist in either location (cloud-resident or cloud-edge) depending on their function. Thus, firewalls, switches, and routers are typically considered traditional cloud edge devices since they provide an entry point; however, servers and storage can also be considered cloud edge as they can exist in either location.

In a typical large-scale system, the type and number of interfaces may vary across a wide range of device types, manufacturers, models, versions, and so on. Each device may thus present a unique set of commands and conventions to properly configure and maintain the interface between the network node or terminal and the network 110. Due to such potential complexity, setting up such devices has become an expensive and time-consuming task handled by specialized IT professionals. To help overcome this burden, the use of a natural language translation system described herein allows for generalized language to be used to manage and control a specific manufacturer (e.g., Cisco, Juniper, Cumulus, or Dell networking) device in a heterogeneous network. This allows a generic language based on natural language syntax to be used to easily configure a switch or router, a storage device from multiple vendors, a firewall, and a server system in addition to other network connected devices. It also allows for the utilization of non-traditional mechanisms for controlling and managing the network device operations. For example, solutions such as Instant Messaging (IM) services, chat systems, and chat-bots can be utilized to provide the front-end access to the systems.

Network 100 may represent any appropriate computer network and network topology, such as used such as used for data centers, server farms, and other similar systems including automation and control systems, industrial applications, and so on. For example, the natural language interface to a device can be utilized on factory floors for controlling operations via a voice interface and the translation of a general language message to specific device languages.

To move the interface operations of networking devices toward an Intelligent Machine model, embodiments of the natural language translator module utilize natural language modeling and learning to provide a translation service function that can scale from a micro-service in a device to a macro-service in the cloud. The intent of the translation service function is to allow natural text, speech, or wording to be utilized to operate network devices. Natural phrases such as "I want to view the configuration on switch23" or "Create virtual LAN 202 on switch12 using ports 2, 3, and 5 and enable it" can be utilized on a network switch or router instead of specific command sequences that are proprietary to each device. These natural language messages are translated to the proper sequence of operations in order to retrieve the configuration of the device or to create the specific interface type using the designated ports.

Embodiments can be extended to configure computers or systems of computers as well. For example, natural phrases like "I want to create a Virtual Machine with 500 GB of storage running Ubuntu 16.04" or "What is the status of server group 1?" can be utilized on a data center. These messages would translate actions for configuring a VM on a server cluster with storage allocated from a storage array or gathering the overall status information on the server group systems (capacity, utilization, etc.), storage, and network connections, respectively.

A macro-service cloud-based solution may be implemented on a device in the network that is not memory restricted, such as a server system located in the network. An example of this embodiment is illustrated in FIG. 1 by natural language translator process 103 executed on a server computer 102 in cloud network 110. This embodiment is not limited to a server since it could also reside in network switch, router, or appliance in network 110 provided that the device has necessary resources (e.g., memory, processor capacity, interface capability) to perform the operations.

Figure 2:
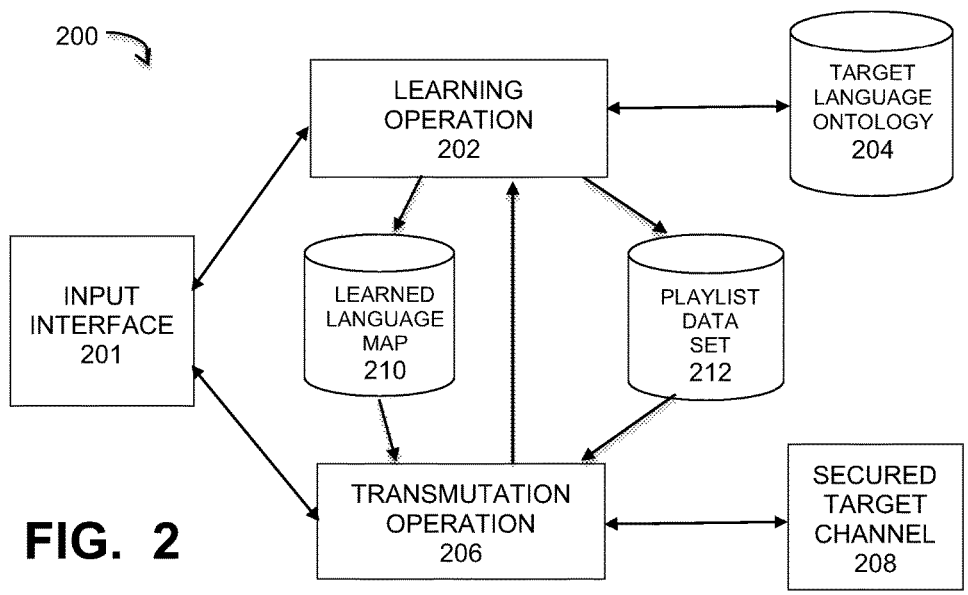
FIG. 2 is a block diagram that illustrates components of a natural language translation process in a cloud-based solution, under some embodiments.

FIG. 2 is a block diagram that illustrates components of a natural language translation process in a cloud-based solution, under some embodiments. As shown in FIG. 2, the natural language system 200 contain the transmutation operation component 206 and learning operations component 202. These components can be co-located in the same device or processing space. The system has an input interface 201 that receives messages from the client device. The transmutation operation 206 performs the classification, translation, and action operations for converting the message received from the input interface into the language of the target device for performing the requested operation. The requested operation is indicated by the playlist data set element 212 which is a set of commands or actions in the target device language. The output of the transmutation operation is sent to a secured target channel (e.g., SSH, REST, Ansible) 208 that provides the network connection path to the target device. For the secured target channel the process may create an SSH connection and run the device command, or it may use Ansible to set up a secure connection to talk to switch, or similarly use REST to transmit the command, though embodiments are not so limited.

The learning operation 202 is functionally coupled to the transmutation operation through a feedback path from the translation process. The learning operation identifies and learns new frames of text or speech and updates the learned language ontology 204 with the new information and then updates/regenerates the learned language map 210. This allows the learning operation to access and update the playlist 212 when new playlist entries are added to the set for use by the transmutation engine (or operation). The transmutation operation 206 receives input from the learned language map 210, which is updated by the learning operation 202; it also receives generic data from a playlist data set 212. Although the arrow between transmutation operation 206 and learning operation 202 is shown as unidirectional (from 206 to 202), it should be noted that bi-directional flow may be available in an alternate embodiment that includes a replay signal sent from the learning operation to the transmutation operation.

The learning operation includes the ability to have client interaction in the learning process through the input interface 201 in order to validate the understanding of the new information being included in the mapping system for the translation operation. This allows for not only a static learning method, but a dynamic learning method to be achieved.

In an alternative embodiment, the natural language translation process may be provided as a native device microservice solution that exists in an edge device and operates in a memory restricted environment, such as network storage, switches, routers, firewalls, and so on. Thus, as illustrated in FIG. 1, the device-based implementation is represented as a natural language translator (NLT) process (e.g., NLT 107a-d) executed in respective edge devices, such as routers 106a and 106b, or appliance 112 or storage 114.

Figure 3:
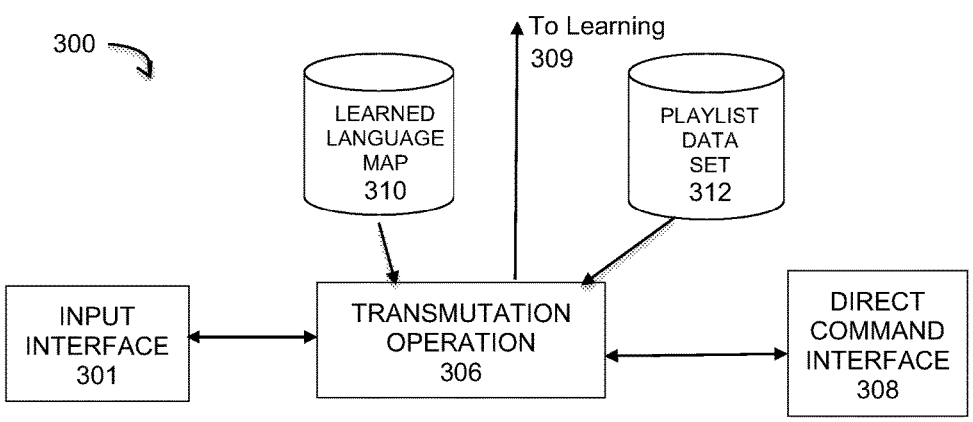
FIG. 3 is a block diagram that illustrates components of a natural language translation process in a native device-based solution, under some embodiments.

FIG. 3 is a block diagram that illustrates components of a natural language translation process in a native device-based solution, under some embodiments. As shown in FIG. 3, the native device micro-service system 300 comprises relatively few process components to operate the restricted memory space of edge devices. System 300 includes transmutation operation component 306, which is coupled to input interface 301 and provides output through a direct command interface 308. The learning operation component is generally not provided as a device-resident component in order to minimize the data storage requirements of the typically resource-limited device. To support learning, a feedback path 309 from the transmutation operation 306 to a cloud based learning system is necessary. This allows the native device system to identify unknown requests and feed them back to the learning operations to expand the knowledge base. The learning would then update the language ontology contained in the learned language map 310 and playlist data set 312 on the native device.

Transmutation Operation

As shown in FIGS. 2 and 3, the major components of the natural language translation process are the transmutation and learning operations. The transmutation operation (206 or 306) provides the parsing, classification, translation, and action processing operations that convert a natural language message provided through the input interface (201 or 301) into a device language operation message for direct command interface on the device. This requires that the transmutation operation understand the specific device language semantics to that it can directly convert the message into actionable operations within the target device.

The transmutation operation relies on a learned language map (210 or 310) to aid in the conversion of a message to the device's specific operation language. The device specific operation language is conveyed by a playlist data set (212 or 312) which defines the sequence of actions to be taken based on an understood command. The playlist data set and the learned language map are derived from the learning operation.

The natural language translator provides a transmutation function set that can receive natural language messages from an interface, convert the natural language messages into device actionable commands that are either sent to the network devices (switches, routers, servers, storage devices). In the cloud-based embodiment of FIG. 2, the device actionable commands are sent over a secured communications channel 208, while in the native device-based embodiment they are executed directly on the target device through a direct command interface 308. The transmutation function set operates on parameter data sets which contain learned language ontology frameworks as well as playlist command sets to perform the operations on the target device specified.

Figure 4:
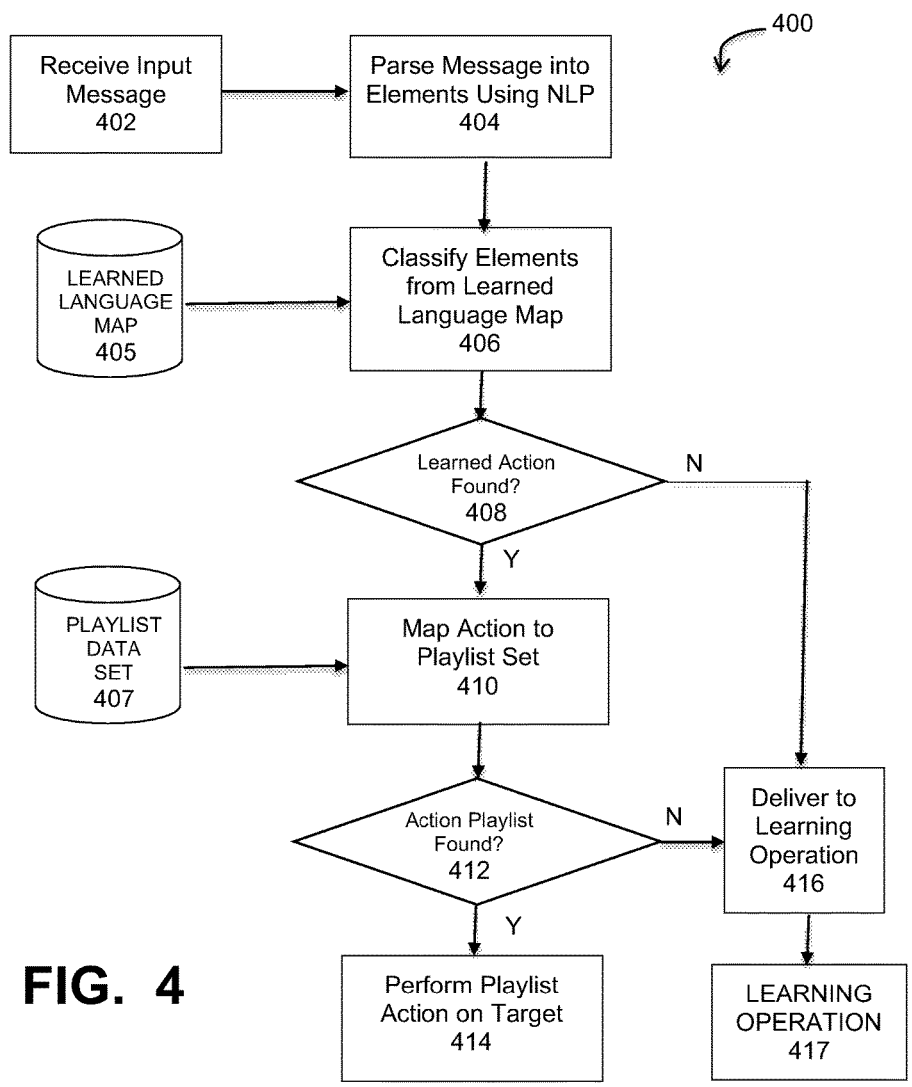
FIG. 4 is a flowchart that illustrates a transmutation process for use in a natural language translation system, under some embodiments.

FIG. 4 is a flowchart that illustrates a transmutation process for use in a natural language translation system, under some embodiments. Process 400 of FIG. 4 begins upon receipt of a message at the input interface, block 402. The received message is then parsed into language elements using natural language processing (NLP) techniques to determine the type of language semantics, step 404. Additional parsing is also performed to identify action words, target identifiers, and parameter data that is to be utilized or applied as part of the action to be performed. In general, NLP techniques involve known processes that receive spoken or typed input from the user and uses large natural language corpora to analyze the natural language input. Known solutions or products can be used for this parsing step 404, such as the Cloud natural language API from Google, and other similar products.

Once the message is parsed into the language elements, the elements are classified against the learned language map data 405 to identify the desired action specified in the received input message, step 406. This classification process queries the learned language map data for matching action operations based on the provided elements. In step 408 it is determined whether or not the learned action is found in the learned language map. The results of the query operation will either result in either a closest match action being found (if found) or an indeterminate message (if not found). In the case of an indeterminate message, the learned action is not found, and the transmutation function delivers the message information to the learning operation 417, step 416, for inclusion of the new language into the learned data set. In this case, the learning operation 417 will interact with the user to determine the correlation of the message with the desired target action.

In the case of a closest match action being found in step 408, the process 400 then proceeds to the playlist mapping stage where the action is mapped to the target language command set utilized to perform the required action, step 410. In this stage, the playlist data set 407 is queried for the matching operational context for the target in the target device language.

In decision block 412, it is determined whether or not the action playlist is found. If so, with the matching playlist, the operation is then performed on the target device either through direct commands on the target (for the native-device embodiment) or through a secure management interface channel to a remote device (for the cloud-based embodiment), step 414. Once the operation has completed, the feedback of the operation either the success or failure is provided back to the user. In the case of not finding a matching playlist for the action in step 412, the function will deliver the message information and action match data to the learning operation for subsequent update on the appropriate mapping tables, step 416. This case is primarily an error condition that needs to be handled by the learning operation 417 in its updates to the language ontology data used by the transmutation operation.

In general, for the process of FIG. 4, the detection of an action word triggers the process of natural language translation process 400. Typical action words are verbs that correspond roughly to specific data commands, such as "get," "start," "stop," and so on, as may be defined in a dictionary set of generic words. The NLP process 404 typically parses the input message to determine which word is the likely action word based on location or a match with known action words. The action words may be initially provided through seed set of commands, while the other words are learned through a learning process that builds the learned language map 405 to match a message phrase to a specific device command or commands, and these commands comprise the playlist dataset 407.

In an embodiment, instead of using the entire phrase, the parser 404 breaks the input into individual words and looks at a match probability of each word in its position within the input message to determine how it corresponds to the device command. For this embodiment, the natural language translation process is based on a match probability that is dependent on word position. The complete generic input phrase is thus translated into a device command or commands using the action trigger and word position to drive the learned language map.

Many interface devices utilize roughly the same syntax and words for most of the common user commands. This can be used to establish a set of seed data that builds the learned language map. Thus, the seed data may be built on a generic set that is known to work for any device plus any specific commands of a language corpus that was learned for that device, if any. Following is a diagram that illustrates the transformation of the seed data through the natural language translation process, in an embodiment:

Seed_Data→Learning_Process→Matching_Map→Classification/Parser

Once recognized, translated, the input message is matched to the appropriate device command using the playlist dataset 407. The playlist dataset 407 comprises the actual device instructions that map the command that is input to the actual device command. It should be noted that the best match for an input message in the playlist may either be a single command or a series of commands that execute the requested action. For example, if the input message is "take a look at set of data on the switch," the NLT process may generate the device command: show_running_config, which is a single command. In contrast, the message "show system data" may require two device commands: show_system (shows software settings) and show_system_inventory (shows hardware configuration).

Learning Operation

As described above, the natural language translation operation also includes a learning mechanism, which creates and updates the language ontology framework as it learns both the language of the target device and the generalized natural language that is associated with each target device command. The learning engine that supports the learning operation operates on the language set in order to create the device specific playlist data set and the language map (which may take the form of a data matrix or correlation structure) that is utilized by the transmutation engine functions for translating the generalized message to the specific device command(s).

Figure 5:
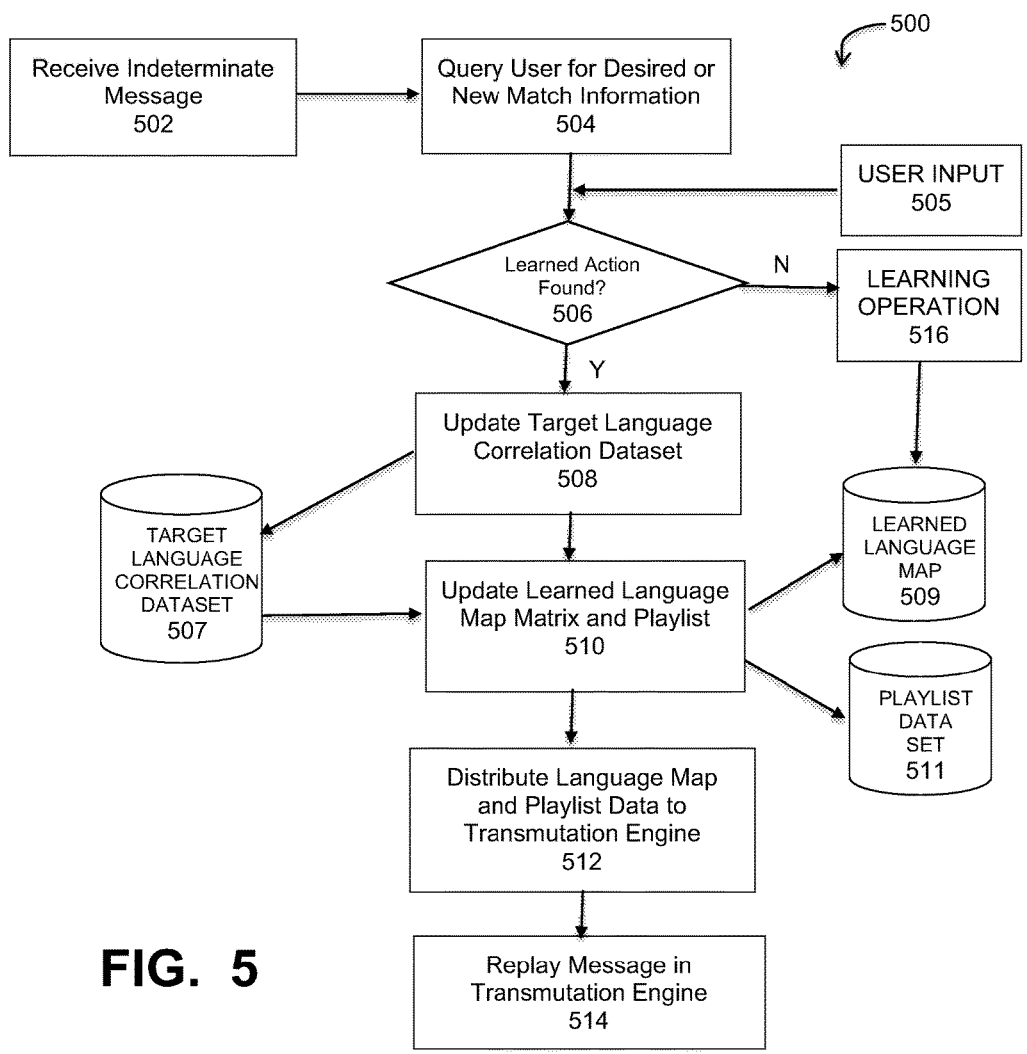
FIG. 5 is a flowchart that illustrates process steps for the learning engine of the natural language translation process, under some embodiments.

In an embodiment, the learning engine provides both static and dynamic functionality. FIG. 5 is a flowchart that illustrates process steps for the learning engine of the natural language translation process, under some embodiments. Process 500 of FIG. 5 illustrates a dynamic operation of the learning engine. This dynamic operation begins when a message that cannot be mapped by the transmutation operation is received at the learning engine process, step 502. In the dynamic flow 500, the user who sent the message is provided a set of possible action matches to select as the desired action, or is queried to provide the desired action information for the message, step 504. On receiving the action match information through the responsive user input 505, the learning engine will update the ontology framework with the new information, step 508. For the embodiment of FIG. 5, this ontology framework is embodied in a target language correlation dataset 507 with the new information. This update comprises either adding a new entry into the language framework, or inserting a new message correlation into an existing entry in the dataset 507. If the learned action is not found, the process accesses the learning operation, which updates the learned action map with the unrecognized action.

Once the dataset 507 is updated, the learning engine updates or generates the learned language map 509 and playlist dataset 511 that are used by the transmutation operation for translating the generalized message, step 510. This is done by learned dataset flow process for dataset generation, and is described in greater detail below. After the datasets are updated, the learning engine distributes the information to the transmutation engine, step 512. This is accomplished by either placing the new data into the file space of the local engine, or by transferring the files to the remote device so that the micro-service that is operating on the device can pick-up the newly updated data. Once the new information is distributed, the learning engine then signals the transmutation engine to replay the previously received indeterminate message 502, as shown in step 514. Since the new mapping has been added to the learned data set, the transmutation engine is now able to determine the best match and perform the desired operation.

In addition to the dynamic process illustrated in FIG. 5, a second type of learning operation is the static learning operation. In an embodiment, the static learning operation is a set of functions that are provided to generate the learned datasets based on the seed information in the target language correlation dataset 507. These functions are typically used to create the initial target dataset files, e.g., the learned language map 509 and playlist data set 511, utilized by the transmutation engine.

Figure 6:
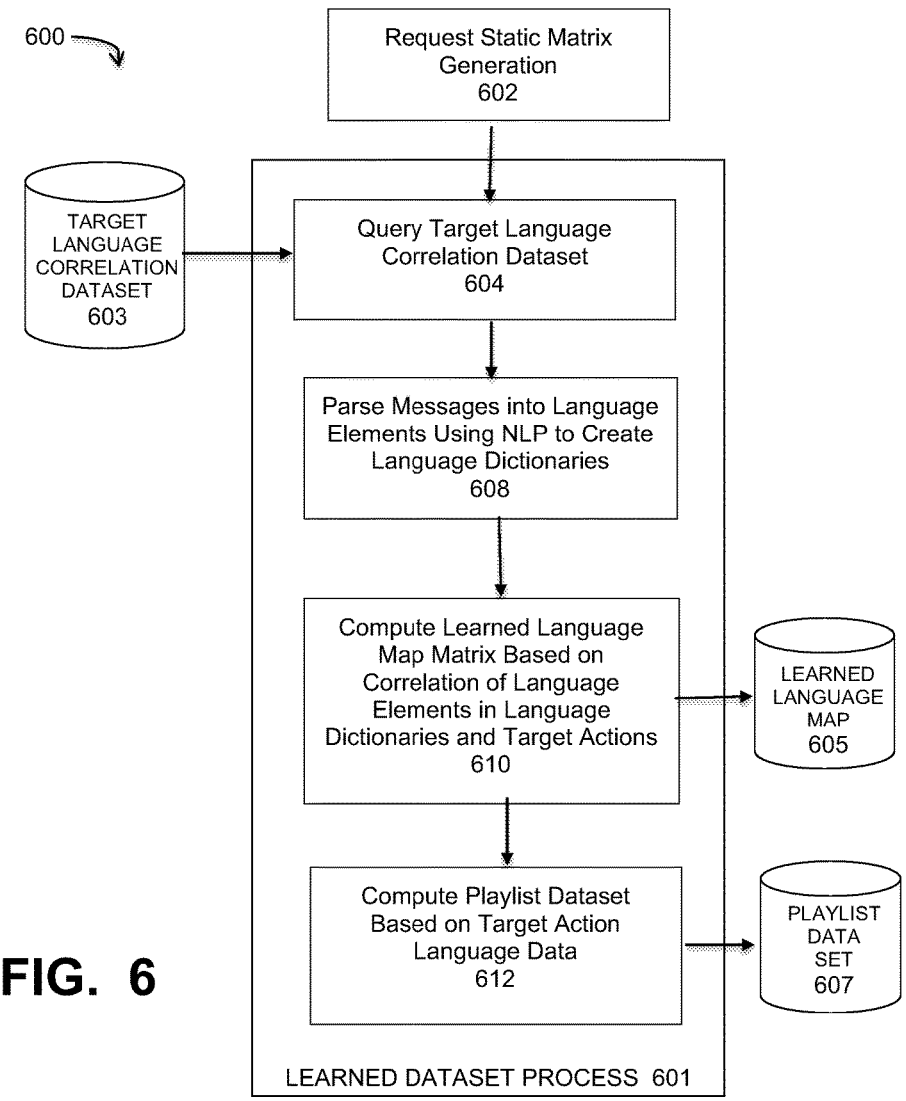
FIG. 6 is a flowchart that illustrates the learned dataset flow process, under some embodiments.

As mentioned above, learned dataset flow process is used to update/generate the learned language map and the playlist dataset, along with any other appropriate dataset. FIG. 6 is a flowchart that illustrates the learned dataset flow process, under some embodiments. The overall process 600 starts with a request to generate the static map, step 602. The learned dataset flow 601 of process 600, is the core set of operations that create the learned language map 605 and the playlist data set 607 from the target language correlation data (language ontology) 603. As part of this operation, the learning engine queries the target language correlation data 603 for the message and target action data pair sets, step 604. The messages in these pair sets are parsed, in step 608, into language elements where the action word(s), variable keywords, target keywords, and descriptive keywords are identified. The keyword sets are each associated with a playlist set, and these keywords and associations are built into a set of language dictionaries for the target devices.

After the building of the keyword sets and language dictionaries, the learned language map can then be computed, step 610. The learned language map is computed based on the correlation of language elements in language dictionaries and target actions. The computation of the learned language map takes into account the probabilistic view of the elements in the message being the desired target action to perform on the device indicated. The probability of the element being in the message is based on the entire language dictionary, as well as the frequency of the specific message element being in that message set for that specific action. This permits the building of a learned language map where the message element and its order with other message elements can provide a flow map to the best match action for a device. In step 612, process 601 computes the playlist dataset based on the target action language data using the playlist dataset 607. Given that many devices have similar action results (for example "show software version"), the commands associated with a device may be different between different vendors in their execution. The playlist in dataset 607 provides the device specific difference since the playlist can exist for each specific vendor device.

Figure 7:
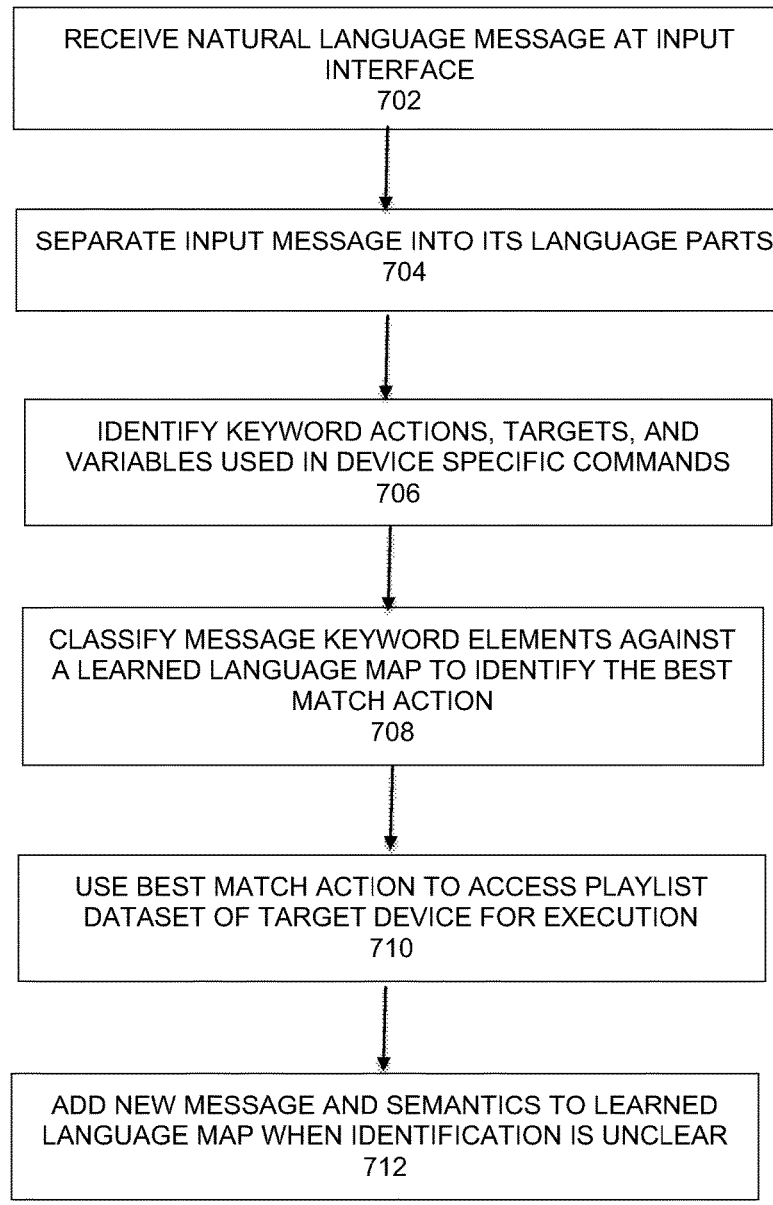
FIG. 7 is a flowchart that illustrates an overall method of performing natural language translation for networked devices, under some embodiments.

FIG. 7 is a flowchart that illustrates an overall method of performing natural language translation for networked devices, under some embodiments. As shown in FIG. 7, the process starts by the NLT process receiving a general or natural language message at an input interface, step 702. The process then dissects or separates the input message into its language parts, step 704, and identifies keyword actions, targets, and variables used in the device specific commands, step 706. The process then classifies the message keyword elements against a learned language map to identify the best match action, step 708. It then utilizes the best match action to access the playlist dataset for the device specific commands of the target device for execution, step 710. When the identification of the best match is unclear, such as through the utterance of a new or unrecognized command, the process adds new message and language semantics into the learned language map through a feedback path to a learning operation, step 712.

Figure 8:
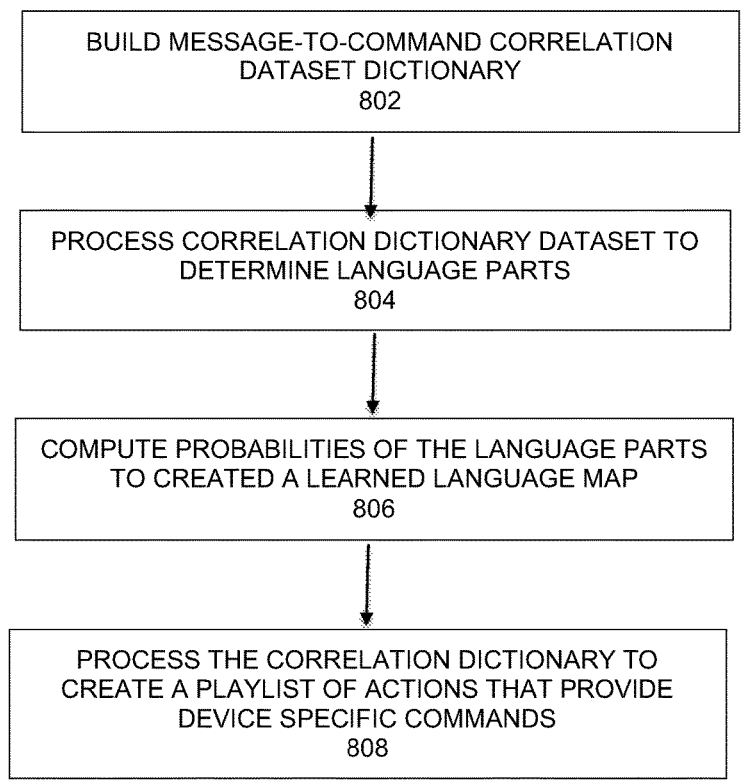
FIG. 8 is a flowchart that illustrates a method of compiling and processing natural language message requests to produce datasets for translation into device specific commands, under some embodiments.

The process of FIG. 7 can also be expressed as a method of learning the language of a device in order to convert general language message requests into device specific commands. FIG. 8 is a flowchart that illustrates a method of compiling and processing natural language message requests to produce datasets for translation into device specific commands, under some embodiments. FIG. 8 illustrates a general method of learning the language of the device in order to convert general language message requests into device specific commands. The process begins by building a message-to-command correlation dataset dictionary, step 802. This can be done by starting with a seed dataset that is initially defined for a number of known devices using known or expected vocabulary and syntax elements. This dataset can comprise a simple database that correlates a typical or expected natural language message (e.g., "Get Router MAC Address") and correlates this to the corresponding command for a particular device (e.g., for a Cisco router: "show interfaces gigabitethernet 2/0/0").

The NLT operation then processes the correlation dictionary dataset to determine the language parts, step 804; and computes the probabilities of the language parts to create a learned language map for translation of messages into device specific actions, step 806. It then processes the correlation dictionary to create a playlist of actions that provide the device specific commands.

A number of pre- and post-processing operations may be associated or used with, or incorporated in the NLT processing methods of FIGS. 7 and 8. For example, the terms "natural language" and "generalized language" are used interchangeably to refer to spoken language used by human users. It may be assumed that the input language is standard English, but of course, many other languages may be used. The system may include a language translator to translate a foreign language into an acceptable natural language prior to input to the NLT system through the input interface. For example, if the NLP engine is an English-language based engine, pre-translation of the foreign language may be performed to first translate the message into English prior to processing by the system. Similarly, if the message is generated by bots or devices that have their own accepted generalized language, pre-translation may be necessary. Other pre-processing operations may include optical character recognition (OCR) for scanned or electronically input messages, and other similar message processing operations. Post-processing operations may include publishing the correlation dictionary or learned language maps into a form for incorporation into a standards library, providing alarms or notifications to the user in the event of unclear message inputs, and other similar post-processing operations.

The natural language translation operation may involve the need for user intervention or input during one or more stages of the translation process. For example, the process is configured to learn new or unrecognized commands to build the learned language map. As such, unrecognized command input is expected, so appropriate prompts are provided to the user. Such prompts may provide interaction in the form of selectable alternative phrases based on previous learned phrases, or other machine learning or artificial intelligence techniques.

Embodiments or parts of the natural language translation system may be provided as a product or service in various different forms. For example, the algorithms for the NLT functions can be provided as software programs. A toolkit may also be provided to create the playlist and learned language map, along with a software program for the learning operation that generates the learned language map. The tool may allow the user to create a list of targets, such as by vendor, device, make, model, etc. The tool can also create the playlist map of target command operation that has commands that the device understands along with generic command messages. Different user interfaces can also provide mechanisms to allow the user to define action words, dynamically add action words, and so on.

System Implementation

Embodiments of the natural language translator allow for the use of generalized language to interact with network devices instead of the specific device commands. A cloud-based service is provided that resides on a server of other device in the network (switch, or router) with sufficient processing resources to provide translation and learning operations. In this embodiment, translation and learning operations can be co-resident or distributed on the same server (or other device). In a micro-service solution, the natural language translator resides on an edge-device in the network that has restricted processing resources and provides the translation operations internally, while the learning operations can be performed off of a separate server to provide a distributed architecture to provide the learning.

Figure 9:
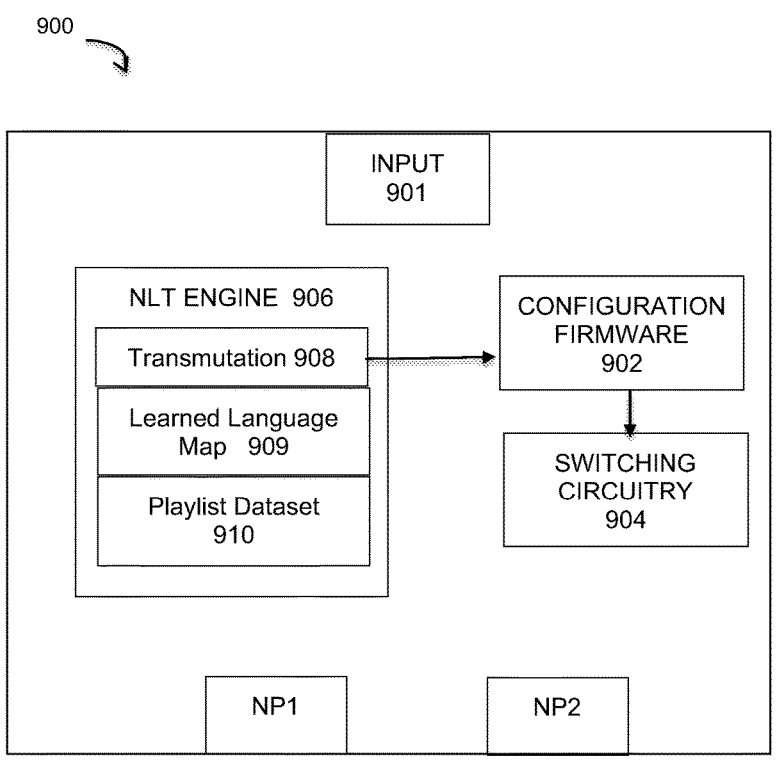
FIG. 9 illustrates an implementation of the natural language translator as part of a micro-service solution, under some embodiments.

FIG. 9 illustrates an implementation of the natural language translator as part of a micro-service solution, under some embodiments. For this embodiment, the natural language translation process is integrated into an edge device (e.g., switch or router) as part of a device-resident function. FIG. 9 illustrates a representative switch 900 having an input port and a number of output ports (e.g., NP1, NP2) along with appropriate switching and interface circuitry 904 and configuration settings 902. The switch is configured and operated through a set of device specific commands that are defined for the particular device by the device manufacturer and that are typically unique to that model, device, or family of devices. Switch 900 also includes a resident natural language translation engine 906 that performs the functionality illustrated in system 300 of FIG. 3. That is, on-board the device is a transmutation component 908 executing the transmutation operation (306) along with the learned language map 909 and the playlist dataset 910. These components receive the user input through input port 901 or other input mechanism. The NLT engine then translates the natural language input into the device specific commands (in the methods described above) and provides these commands to the configuration interface 902. Per the normal device operation, these device commands are then processed to set the switching circuit 904 accordingly.

It should be noted that FIG. 9 is provided for example only, and represents only one embodiment of the NLT engine micro-service, and many other devices and configurations are possible.

Figure 10:
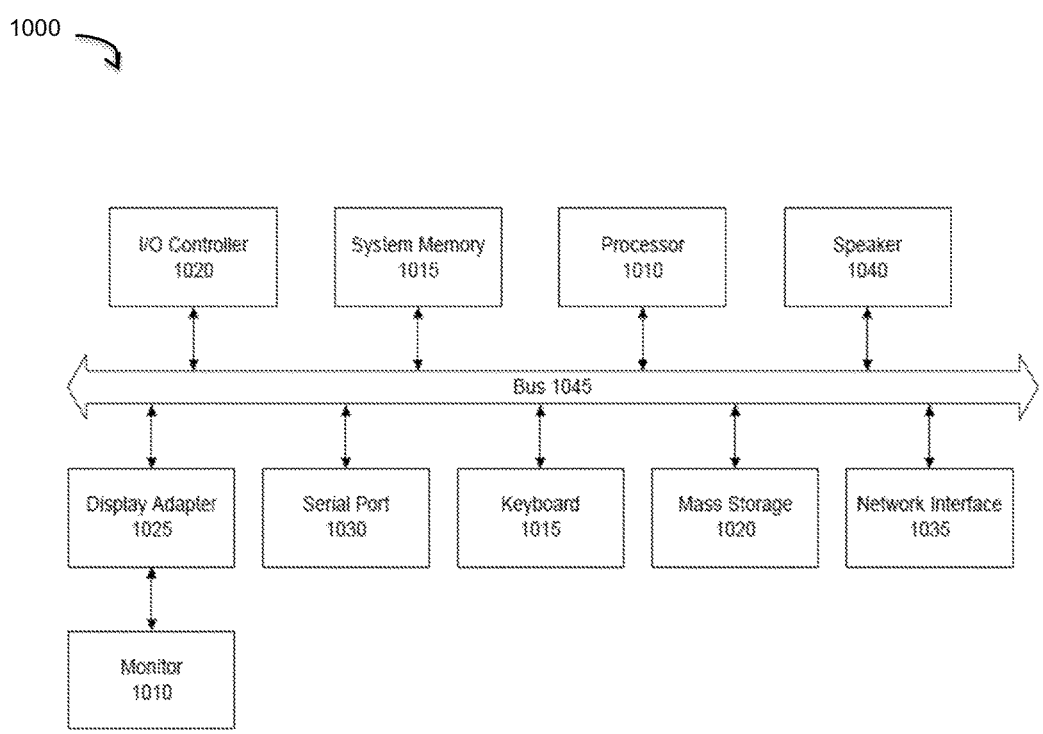
FIG. 10 is a block diagram of a computer system used to execute one or more software components of a natural language translation system, under some embodiments.

As described above, in an embodiment, system 100 includes a natural language interface process. Process 105 may be implemented as a server-side process, as shown in FIG. 1, or it may be an executable module executed by the one or more computers in the network, or it may be embodied as a hardware component or circuit provided in the system, such as device-native components 107*a* and 107*b*. The network environment of FIGS. 1 and 2 may comprise any number of individual client-server networks coupled over or similar large-scale network or portion thereof. Each node in the network(s) comprises a computing device capable of executing software code to perform the processing steps described herein. FIG. 10 is a block diagram of a computer system used to execute one or more software components of a natural language translation system, under some embodiments. The computer system 1005 includes a monitor 1050, keyboard 1015, and mass storage devices 1022. Computer system 1000 further includes subsystems such as central processor 1010, system memory 1005, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 10 is an example of a computer system suitable for use with the present system.

Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Embodiments of the natural language processing and machine learning, as well as cognitive computing are all elements of technology that are on long term technology roadmaps. The ability to provision, control, and interact with a device that is resident in a network topology using Natural Language provides a disruptive shift to the normal method of this operation by eliminating specialized certifications and understanding of specific products. The use of generalized language mechanisms to provide the interface levels provides a market differentiator for device interaction Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of translating an input message into a device specific command, comprising:
   receiving the input message as a generalized language message at an input interface of a network interface device serving as a transmission device connecting an edge of a local network to an external cloud network;
   installing a natural language translator as a micro-service resident in the network interface device to process the input message as natural language input into corresponding device specific commands defined by a manufacturer of the network interface device;
   separating the input message into its language parts to identify keyword elements;
   identifying, using the natural language translator, keyword actions, targets, and variables used in the input message to indicate the corresponding device specific commands;
   classifying the message keyword elements against a learned language map to identify a best match action corresponding to the device specific commands;
   utilizing the best match action to access a playlist data set for the device specific commands of the target device for execution; and
   providing a feedback path to a learning process for adding new message and language semantics into the learned language map when identification of the best match action is unclear.

2. The method of claim 1 wherein the generalized language message comprises a natural language message provided by a user through one of a spoken input or written input to the input interface.

3. The method of claim 2 wherein the network interface device provides an entry point for a network node of the local network to the cloud network, and wherein the transmission device comprises one of: a switch, a router, and a firewall.

4. The method of claim 3 further comprising a transmutation process of the natural language translator performing natural language processing (NLP) tasks including: parsing, classifying, translating, and action processing the input message for converting the input message into the device specific commands.

5. The method of claim 4 further wherein the learning process is configured to create and update the learned language map as a language ontology framework through at least one of a static seed-data based process or a dynamic process using actions iteratively matched to user input.

6. The method of claim 5 wherein a portion of the transmutation process and learning process are provided as co-resident software components in a server computer in the cloud network.

7. The method of claim 6 further comprising transmitting the device specific command over a secured target channel to the network interface device.

8. The method of claim 5 wherein the learning process is provided as a remote process resident on a server computer coupled to the network interface device.

9. The method of claim 8 further comprising transmitting the device specific command over a direct command interface to the network interface device.

10. The method of claim 1 wherein the device specific commands comprise one of: a single device command for performing a desired action specified in the input message, and multiple device commands that together perform the desired action specified in the input message.

11. A method of learning a language to translate natural language into machine commands, comprising:
    receiving an input message as a generalized language message at an input interface of a network interface device serving as a transmission device connecting an edge of a local network to an external cloud network;
    building a message-to-command correlation data set dictionary in a micro-service resident in the network interface device to process the input message as natural language input into corresponding device specific commands defined by a manufacturer of the network interface device;
    processing the correlation dictionary data set to identify language parts of the input message;
    computing probabilities of the language parts to create a learned language map for translation of messages into device specific actions; and
    processing the correlation dictionary to create a playlist of actions that provide the device specific commands.

12. The method of claim 11 wherein building the message-to-command correlation data set dictionary comprises a dynamic process of receiving a number of different input messages and modifying the learned language map based on unrecognized action words.

13. The method of claim 11 wherein building the message-to-command correlation data set dictionary comprises a static process comprising:
    starting with a seed set of data including at least one of: known device commands, generic device commands, and anticipated device commands; and
    modifying the seed set of data through one of corrective user input and learned commands.

14. The method of claim 11 wherein the playlist of actions comprises a database correlating input message data elements to specific device commands, and wherein the specific device commands comprise one of: a single device command for performing a desired action specified in the input message, and multiple device commands that together perform the desired action specified in the input message.

15. The method of claim 11 further comprising updating the learned language map through a learning process that learns commands processed through a natural language processor (NLP) but not matched to any present existing entry in the message-to-command correlation data set dictionary.

16. The method of claim 11 wherein the network interface device comprises one of: a switch, a router, and a firewall.

17. A system translating an input message into a device specific command, comprising:
    an input interface of a network interface device serving as a transmission device connecting an edge of a local network to an external cloud network receiving the input message as a generalized language message;
    a natural language translator installed as a micro-service resident in the network interface device to process the input message as natural language input into corresponding device specific commands defined by a manufacturer of the network interface device;
    a transmutation component of the natural language translator, separating the input message into its language parts to identify keyword elements, identifying keyword actions, targets, and variables used in the input message to indicate corresponding device specific commands, classifying the message keyword elements against a learned language map to identify a best match action corresponding to the device specific commands, and utilizing the best match action to access a playlist data set for the device specific commands of the target device for execution; and
    a learning component coupled to the transmutation component through feedback path, configured to add new message and language semantics into the learned language map when identification of the best match action is unclear.

18. The system of claim 17 wherein the generalized language message comprises a natural language message provided by a user through one of a spoken input or written input to the input interface, and wherein the network interface device comprises an edge device coupling a network node to a cloud network, and wherein the edge device comprises one of: a switch, a router, a firewall, a server computer, and a storage device.

19. The system of claim 18 wherein the learning process is provided as a remote process resident on a server computer coupled to the network interface device.

* * * * *